(12) United States Patent
Pierce, Jr.

(10) Patent No.: US 7,083,763 B1
(45) Date of Patent: *Aug. 1, 2006

(54) FEEDING SYSTEM FOR FUEL GAS GENERATOR

(76) Inventor: Joseph Frank Pierce, Jr., P.O. Box 2017, Blue Ridge, GA (US) 30513

( * ) Notice: Subject to any disclaimer, the term of this patent is extended or adjusted under 35 U.S.C. 154(b) by 600 days.

This patent is subject to a terminal disclaimer.

(21) Appl. No.: 10/252,472

(22) Filed: Sep. 23, 2002

(51) Int. Cl.
*B09B 3/00* (2006.01)
*B23K 9/00* (2006.01)

(52) U.S. Cl. .............. 422/184.1; 110/238; 219/121.59; 588/311

(58) Field of Classification Search ................ 422/184, 422/184.1; 110/238; 219/121.59; 588/311
See application file for complete search history.

(56) References Cited

U.S. PATENT DOCUMENTS

| | | | |
|---|---|---|---|
| 4,181,504 A | 1/1980 | Camacho | |
| 4,644,877 A * | 2/1987 | Barton et al. ................ | 588/311 |
| 4,980,092 A * | 12/1990 | Pineau et al. .................. | 588/1 |
| 5,005,494 A * | 4/1991 | Schlienger .................. | 110/341 |
| 5,136,137 A * | 8/1992 | Schlienger ............. | 219/121.59 |
| 5,451,738 A * | 9/1995 | Alvi et al. ............. | 219/121.59 |
| 5,534,659 A * | 7/1996 | Springer et al. ............ | 588/311 |
| 5,809,911 A * | 9/1998 | Feizollahi .................... | 110/346 |
| 6,066,825 A | 5/2000 | Titus et al. | |
| 6,551,563 B1 | 4/2003 | Kado et al. | |
| 6,763,772 B1 * | 7/2004 | Gnedenko et al. .......... | 110/238 |
| 6,810,821 B1 | 11/2004 | Chan | |
| 6,817,388 B1 * | 11/2004 | Tsangaris et al. ............. | 141/82 |
| 6,818,335 B1 | 11/2004 | Edlund et al. | |
| 6,855,183 B1 * | 2/2005 | Pierce, Jr. .................. | 75/10.22 |

OTHER PUBLICATIONS

"Evaluation of Plasma Arc Technology for the Treatment of Municipal Solid Wastes In Georgia," Jan. 1997.

* cited by examiner

*Primary Examiner*—N. Bhat
(74) *Attorney, Agent, or Firm*—King & Spalding LLP

(57) ABSTRACT

A feed system for loading waste into a fuel gas generator system where the feed system is made of a walled container wherein the outer container back has an outer back hole and the inner container back has an inner back hole, and wherein the holes are aligned and a piston penetrates the holes, wherein the piston is connected to a plate moveably disposed in the container, wherein the piston is connected to sealable opening locks to apply pressure and retract the plate to a position against the back thereby providing a loading chamber to insert waste, a second piston connected to the door retracts the door for loading waste, at least one inert gas injector mounted to the container for flooding the loading chamber with inert gas, a liquid cooling system disposed in the walls of the container, and a controller for operating the locks, doors and sealable opening.

30 Claims, 9 Drawing Sheets

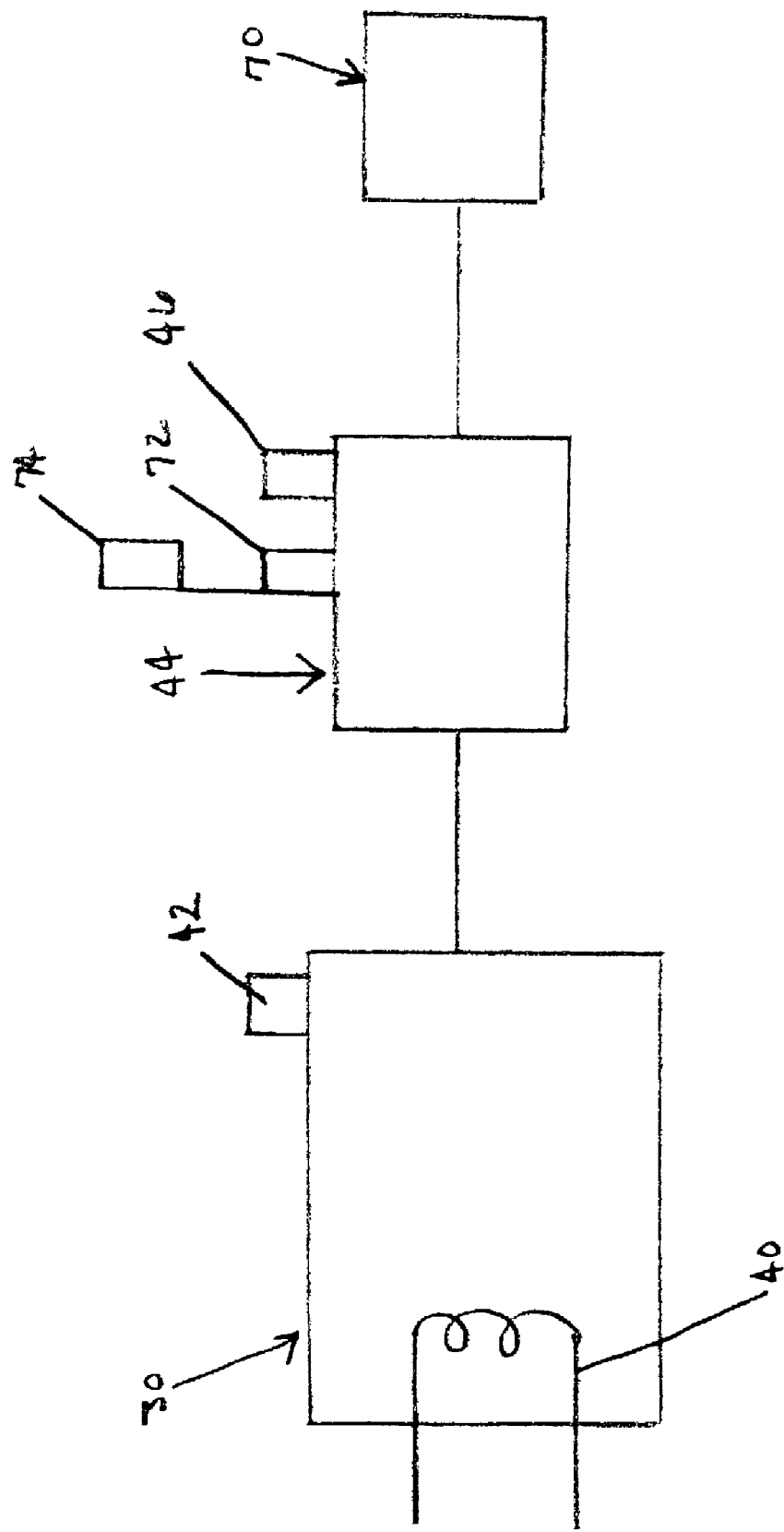

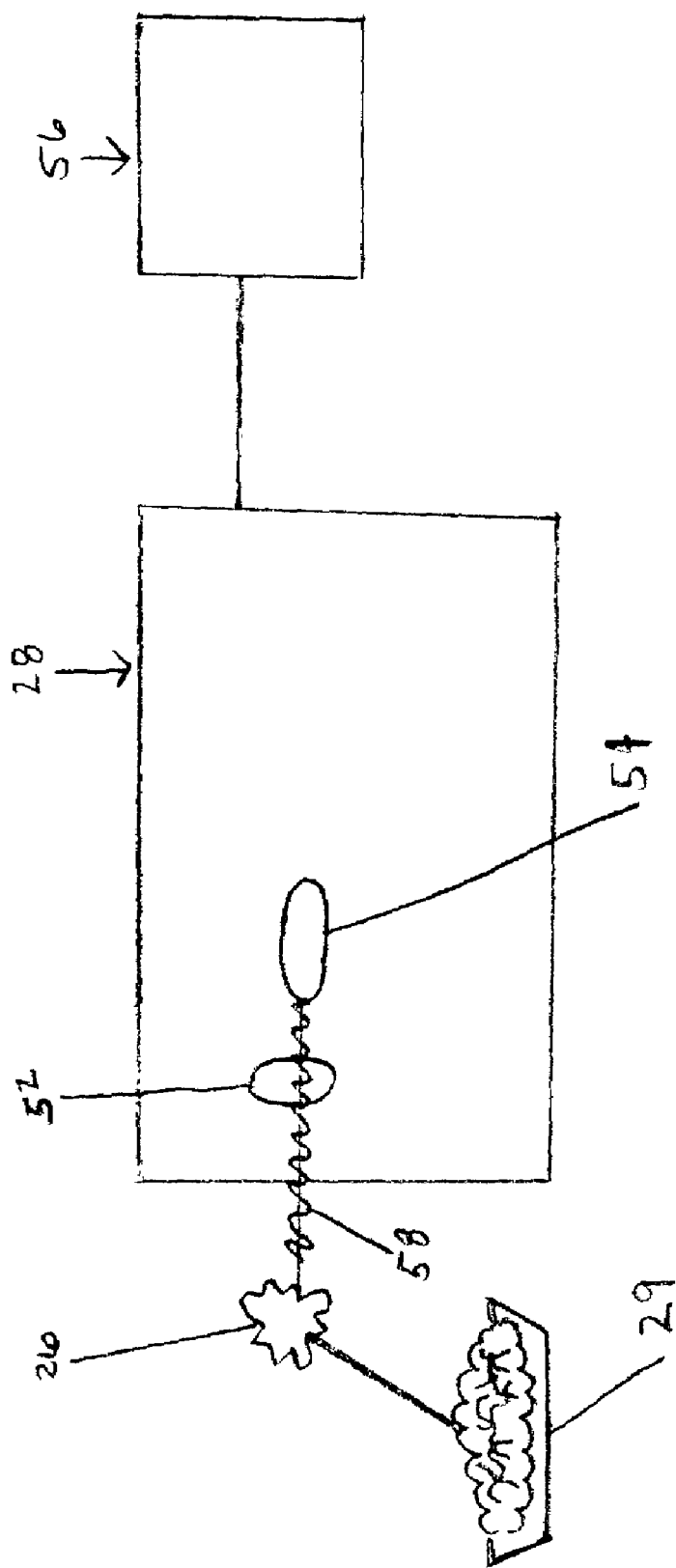

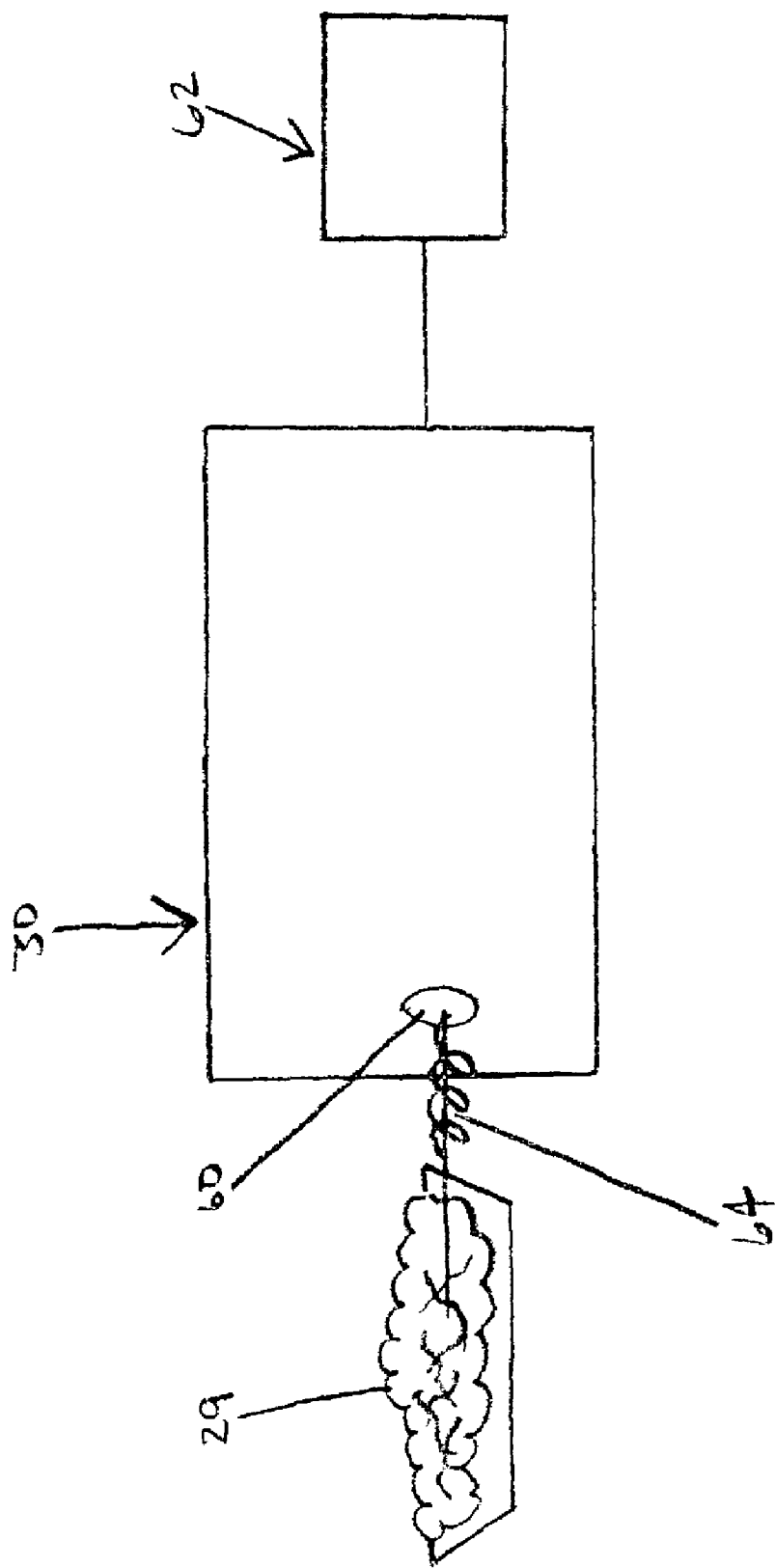

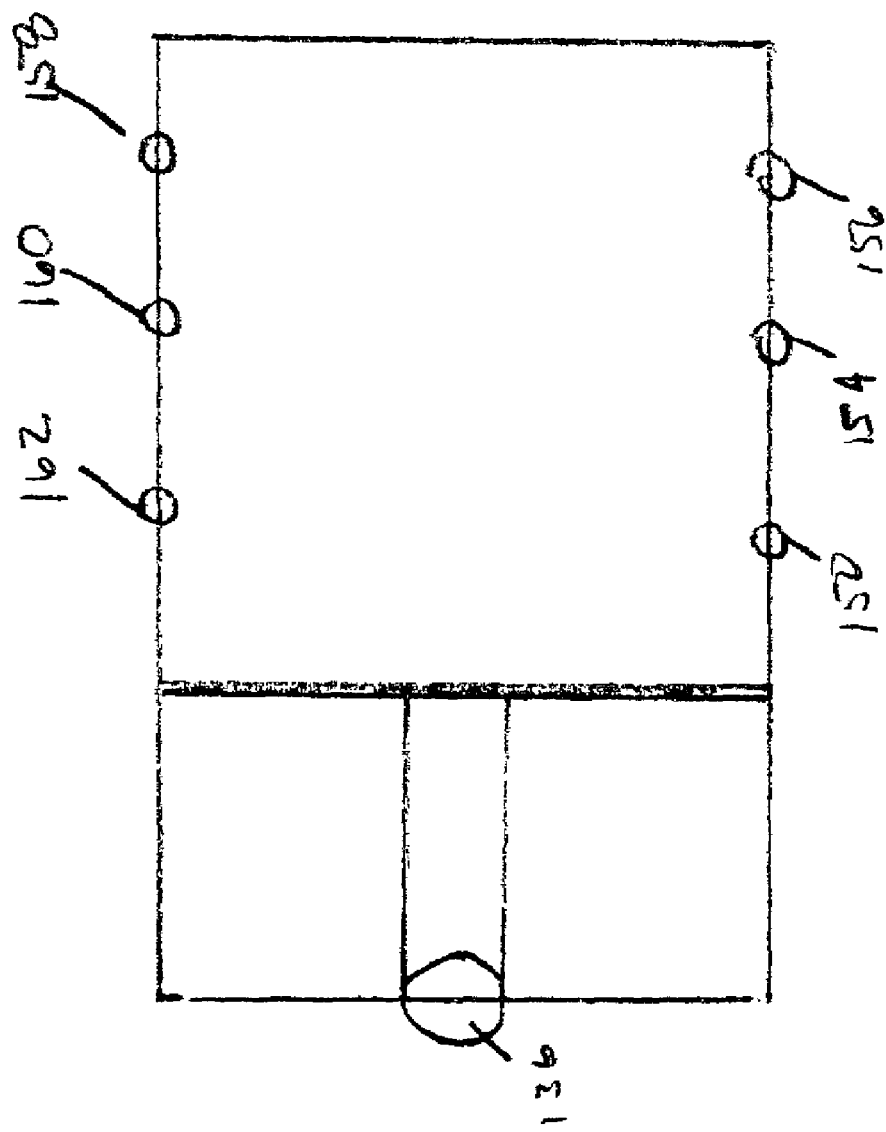

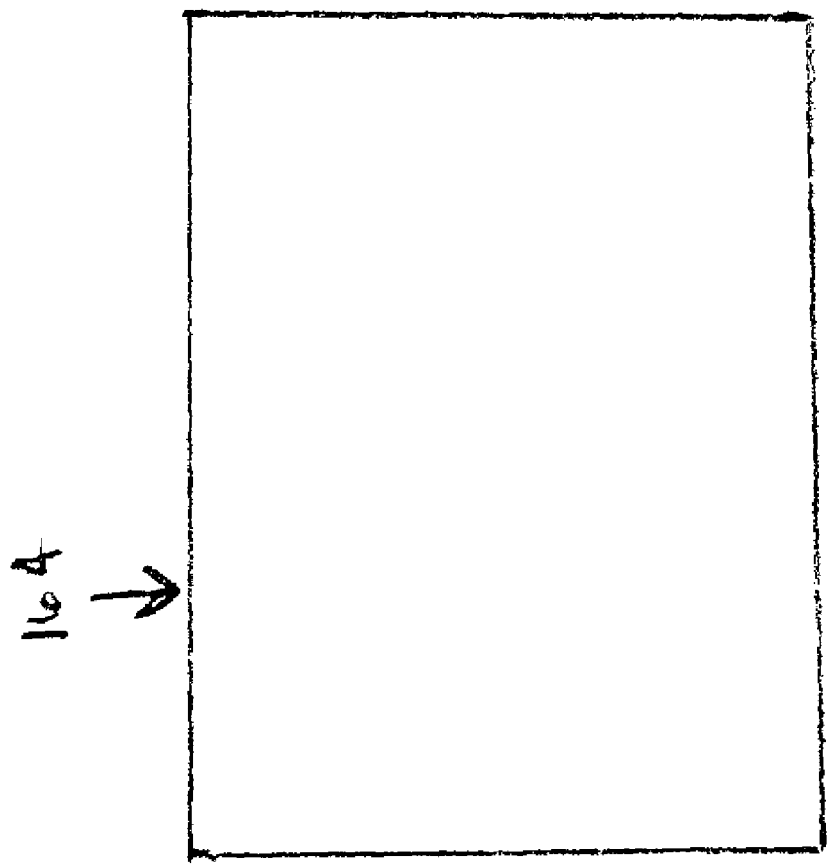

FEEDING SYSTEM FOR FUEL GAS GENERATOR

FIELD OF THE INVENTION

The present invention relates to a fuel gas generator. More particularly, the present invention relates to an automated feeding system for a fuel gas generator that utilizes two different types of plasma arc torches.

BACKGROUND OF THE INVENTION

Plasma is a partially ionized gas. Plasma has traditionally been used in the semiconductor industry to deposit etching, ion implantation and surface treatment materials.

In other industries, plasma arc torches have been conceived for cutting and melting materials.

A need has long existed for a plasma generator that can cut and melt waste materials and provide a process for the recovery of product from those waste materials, such as hydrogen gas, molten metal or other material.

Recently, a fuel gas generator was invented which could be used to recover enough hydrogen from the process to run steam boilers that in turn ran steam turbines and produced power. However, this generator needed an automatic feed handling system to keep production of the steam consistent. In addition to being automated, the feed handling system needed to be inexpensive, and capable of withstanding the intense heat produced by the fuel gas generator.

SUMMARY OF THE INVENTION

An object of the present invention is to provide a feeding system for a fuel gas generator that can be used to produce electricity.

Another object of the present invention is to provide a feeding system for a fuel gas generator that combines the advantages of an automated system with the advantages of being inexpensive to build, modular in construction and inexpensive to operate.

Another object of the present invention is to provide a feeding system for a fuel gas generator that can adjust to the size of the material being handed and in particular can handle various bales of waste material quickly and easily.

The present invention provides a feeding system for a fuel gas generator system for producing hydrogen gas, wherein the generator comprises a vessel consisting of a front, a back, bottom, a first side, a second side, a third side and a feed ramp, a moveable non-transferred torch disposed in at least one side of the vessel for contacting waste in the vessel forming molten material. The generator also has a moveable transferred torch for contacting the molten material disposed in at least one side of the vessel. Further the generator has at least one steam injector disposed in at least one side of the vessel and at least one molten material outlet disposed in the back of the vessel. Additionally, a gas outlet is disposed in the third side of the vessel for transferring gas from the vessel to a dry scrubber. The dry scrubber has a dry scrubber outlet to which a wet scrubber is connected. The wet scrubber receives gas from the dry scrubber scrubs the gas and passes the gas to a wet scrubber outlet to connect to a steam boiler or turbine to produce power.

More specifically, the present invention is a feed system comprising: a sealable double walled container having an outer topside and an inner topside. The outer topside has a first rail, a second rail and a door for slidable engaging the first and second rails. The container has an outer first container side, an inner first container side, an outer second container side, an inner second container side, an outer container back, an inner container back, an outer container bottom, and an inner container bottom. The container outer and inner backs each have an outer back hole and an inner back hole. The outer back and inner back holes are aligned together forming a passageway. The double wall construction comprises a space of between one-half inches to 2-inches in width.

Further, a piston penetrates the outer back and inner back holes. The piston is connected to a plate moveably disposed in the container. At least two spring-loaded door locks are connected to the topside of the container. Each door lock is disposed adjacent to the door for locking the door. At least two spring-loaded sealing locks are mounted on the vessel of the generator system for locking the sealable opening. The piston is connected to the sealable opening locks to unlock all locks and to apply pressure to retract the plate to a position against the back revealing a loading chamber. Waste is then loadable into the loading chamber.

A second piston connects to the door locks to unlock and retract the door for loading waste. At least one inert gas injector is mounted to at least one side or to the bottom of the container for flooding the loading chamber with inert gas, such as nitrogen. A liquid cooling system is used disposed in the space created by the double walls of the container. Finally a controller is used for operating the locks, door and sealable opening of the automated feed system.

BRIEF DESCRIPTION OF THE DRAWINGS

The present invention will become more fully understood from the detailed description given herein below and the accompanying drawings, given by way of illustration only and thus not intended to be limitative of the present invention.

FIG. 2 is a side view of the dry scrubber usable in the invention;

FIG. 3 is a side view of the non-transferred torch usable in the invention;

FIG. 6 is a top view of the feed system according to the invention in a position where waste is about to be loaded into the chamber;

FIG. 8 is a top view of the container of the feed system with 6 inert gas injector ports; and FIG. 9 is a top view of the feed system having a controller.

DETAILED DESCRIPTION OF THE PREFERRED EMBODIMENTS

Before explaining the present invention in detail, it is to be understood that the invention is not limited to the particular embodiments and that it can be practiced or carried out in various ways.

Figure 1:
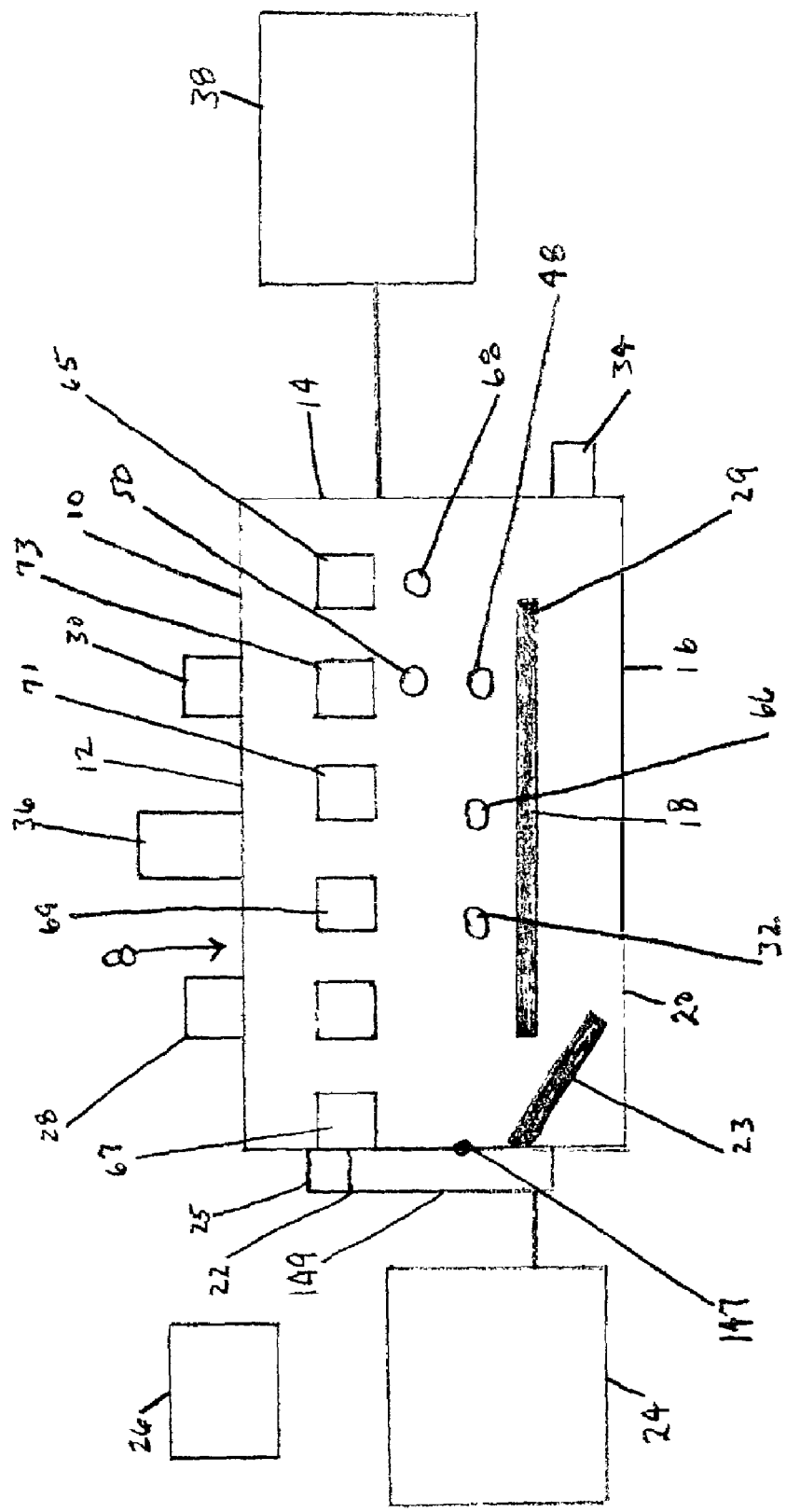
FIG. 1 is a side view of the generator system according to the invention.

The invention is shown in more detail in FIG. 1 and FIG. 2. In FIG. 1, the generator (8) consists of a vessel (10) with a front (12), a back (14), bottom (16), a first side (18), a second side (20), a third side (22). A feed ramp (23) connects between the front (12) and the bottom (16) and is presented at an angle, so that waste will roll down or slide down to the bottom of the vessel. The feed ramp (23) also communicates with a sealable opening (25).

Also in FIG. 1, in the top of the vessel is shown a moveable non-transferred torch (28), which is a type of well-known plasma arc torch is inserted pointing downwardly into the chamber. This moveable torch (28) can rotate and pivot. It acts to cut the wire holding bales of the waste material as it is delivered from the feeding system. The moveable torch (28) contacts waste and creates molten material (29). This molten material is a mixture of metal, such as steel, and the melted waste. The pool of steel used in the vessel (10) usually has a minimum depth in order to be effective.

Continuing in FIG. 1, a second plasma arc torch is disposed in the vessel (10) and also used for keeping the waste material and the metal in a molten state. This second torched is kept in a spaced relationship apart from the first torch. The second torch is preferably a moveable transferred torch (30) for contacting the molten material (29). This second plasma arc torch is also contemplated to be pivotable and rotatable, however, it is initially contemplated to be pointing at the pool of molten metal in the vessel (10) whereas the first plasma arc torch is contemplated to be initially pointing at the waste material as it enters the vessel and moves down the ramp.

At least one steam injector (32) is contemplated to be disposed in at least one side of the vessel (10) however, two or more steam injectors are contemplated as usable in the invention. The steam is used to not into introduce water into the generator vessel (10) to keep material from sticking to the side walls of the vessel, but it is also used as a source of hydrogen, that is, the water of the steam is then separated by the heat of the plasma treatment process and used, with the heated waste material to produce hydrogen gas which is a useful gas for running the steam boilers which in turn run the steam turbines and produce power of this system.

Additionally, at least one molten material outlet (34) is located in the back of the vessel (10) for removing molten steel, or other molten metal. Since one of the waste material components is contemplated to be tires, and tires traditionally have steel belts, as the rubber of the tires is melted, it is expected that the metal steel, will separate from the rubber forming the metal of the molten material pool of the vessel (10).

To remove the hydrogen gas so produced, it is contemplated that at least one gas outlet (36) is disposed in the third side (22) of the vessel for transferring gas from the vessel to a dry scrubber (38). More than one outlet could be used to maximize the capacity of the generator to produce hydrogen. The gas flows into the dry scrubber, is treated in the conventional manner and flows, as to the dry scrubber outlet (42) (See FIG. 2).

FIG. 2 shows a wet scrubber (44) is connected to the dry scrubber outlet (42) for receiving the treated gas from the dry scrubber. The wet scrubber (44) further treats the gas and then this additionally treated gas is passed to the wet scrubber outlet (46). From the wet scrubber outlet, the gas goes on in a conventional manner to the steam boilers to run the fire. The steam boilers in turn run the steam turbines, which are much cheaper, particularly the renovated steam turbines, from the non-steam type.

It is also contemplated, as shown in FIG. 1, that the generator system can include a hydrocarbon injector (48) disposed in at least one side of the vessel for injecting into the waste: oil, other hydrocarbons sewage, sludge or combinations thereof, into the vessel for treatment along with the waste.

FIG. 1 also shows an optional gas BTU enhancer port (66) for inputting a BTU enhancing material (68) to the vessel to increase the BTU ratings of the gas from the gas outlet. It is contemplated that the BTU enhancer material is a calcium carbonate material. Lime is also considered a usable BTU enhancer for this generator system.

Looking again at FIG. 2, it is shown that one embodiment contemplates that the dry scrubber (38) can further comprises a heat exchanger (40) for removing heat from the gas as it passes through the dry scrubber. Additionally shown in FIG. 2 is that the wet scrubber outlet (46) can optimally be connected to a storage tank (70). Further optional considerations include that the wet scrubber can be connected to a wet scrubber flare outlet (72) connected to a flare (74).

Once again returning to FIG. 1, it is shown that the generator system comprises an oxygen injector port (50) disposed in at least one side of the vessel for injecting oxygen into the vessel. The oxygen used in this injector point may be liquid oxygen or oxygen gas.

FIG. 3 provides details on the moveable non-transferred torch (28). This torch has an anode (52) and cathode (54) connected to a power supply (56) for creating an arc (58) to contact with the waste (26) in the vessel (10). The non-transferred torch is adapted to be rotatable to 180 degrees, and adapted to be vertically moveable in the vessel. Preferably, the non-transferred torch is a 2-megawatt, water-cooled torch. It is also contemplated that the non-transferred torch is further adapted to be moveable horizontally.

The power supply is contemplated to be a DC-power supply for the torch.

Figure 4:
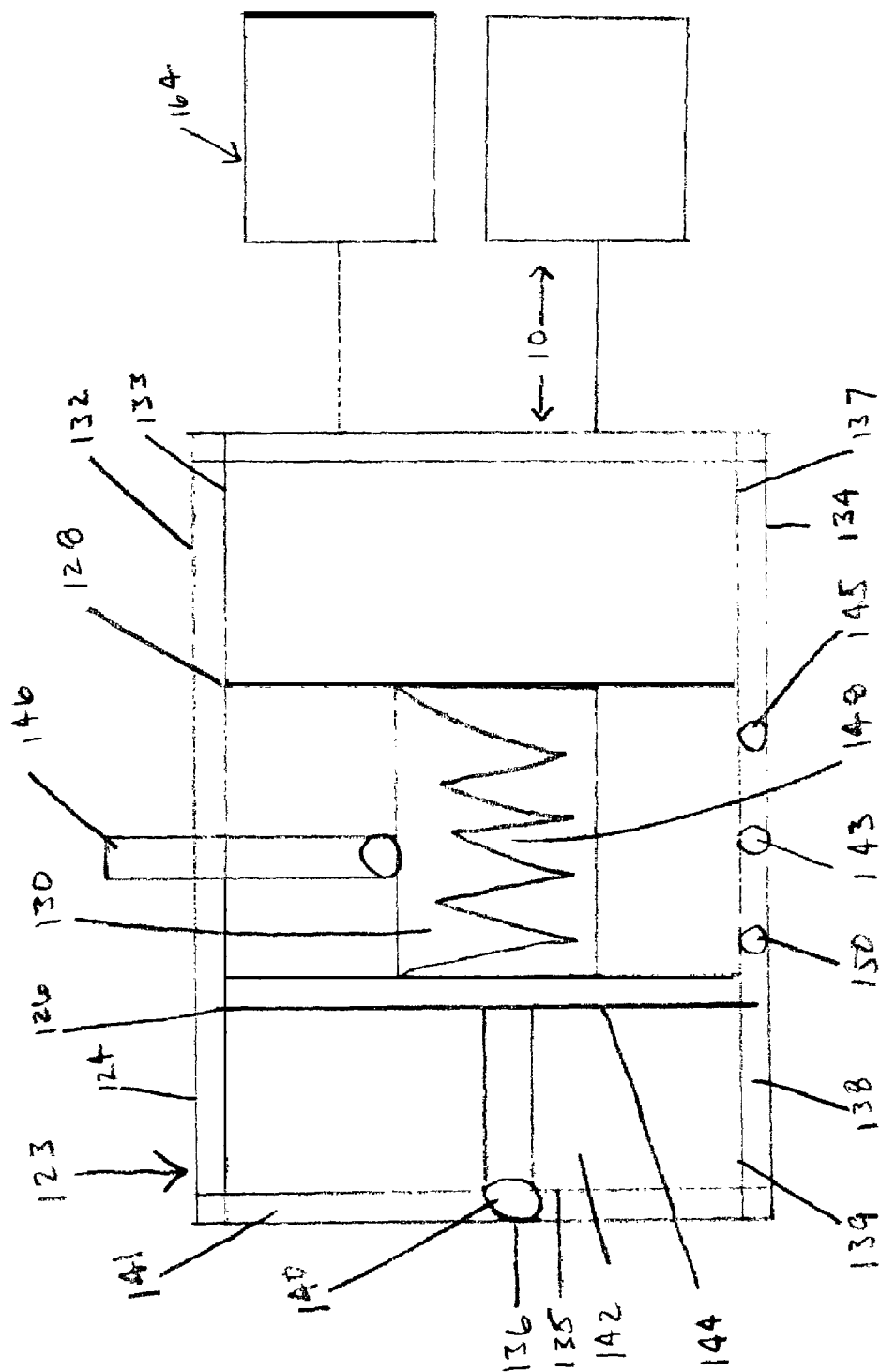
FIG. 4 is a side view of the transferred torch.

FIG. 4 shows the moveable transferred torch (30) has an transferred torch anode (60) connected to a transferred torch power supply (62) for creating a transferred torch arc (64) to contact with the molten material (29) in the vessel and the transferred torch is adapted to be rotatable to 180 degrees, and adapted to be vertically moveable in the vessel. This transferred torch is contemplated to be a 2-megawatt, water-cooled torch. It is also contemplated that this transferred torch is further adapted to be moveable horizontally. The transferred torch power supply could be a DC-power supply.

The waste treatable in the system can be a member from the EPA category of MUNICIPAL SOLID WASTE, SPECIAL WASTE comprising tires and medical waste or HAZARDOUS WASTE or combinations thereof.

The molten material for the generator is contemplated to be steel, carbon or combinations thereof. The molten material outlet (34) (See FIG. 1) preferably has an outer diameter between 2 inches and 6 inches.

In one embodiment, the gas outlet has an outer diameter between 4 and 6 inches and is externally cooled, such as water-cooled.

It is also contemplated that the vessel has at least five insulating walls disposed adjacent the sides of the vessel as shown in FIG. 1, elements (65), (67), (69), (71) and (73). These insulating walls preferably comprise a non-stick refractory material, such as ruby brick refractory material.

Figure 5:
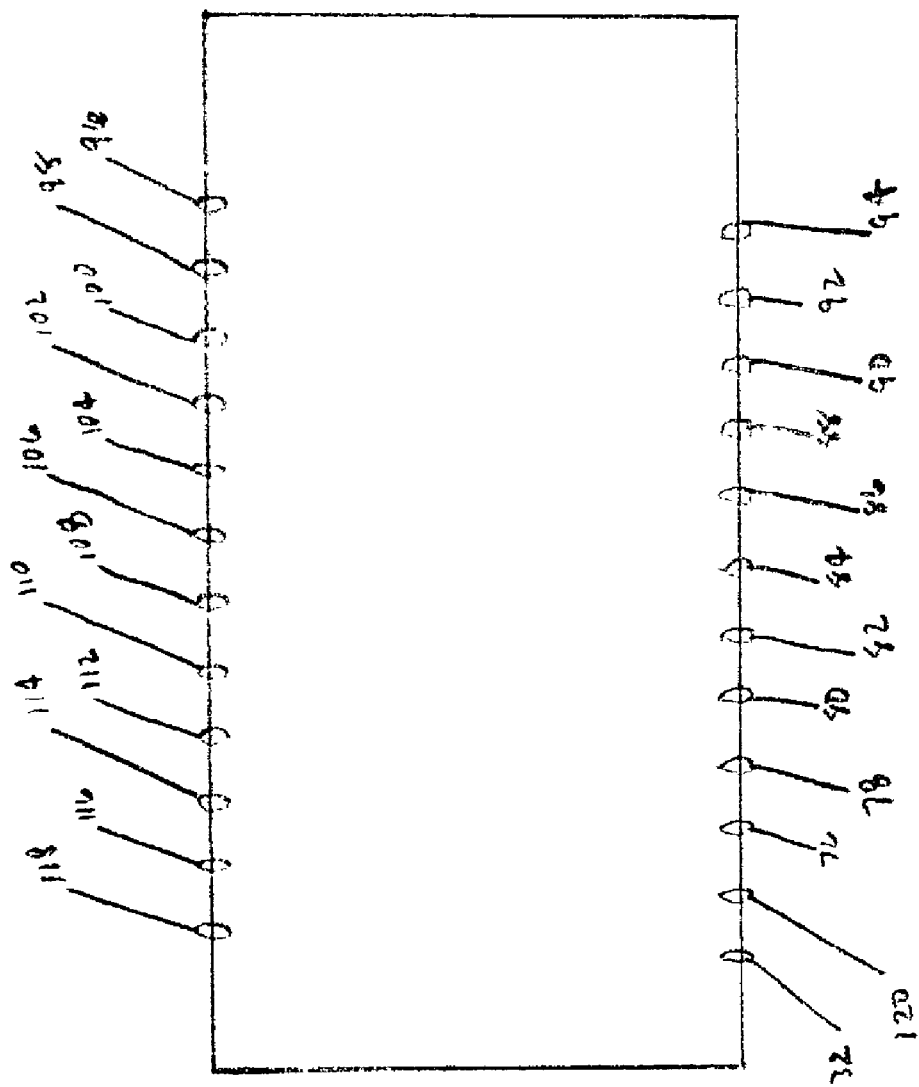
FIG. 5 is a top view of the vessel of the invention with 24 steam injectors.

FIG. 5 shows the four to twenty-four steam injectors disposed in the vessel (76, 78, 80, 82, 84, 86, 88, 90, 92, 94, 96, 98, 100, 102, 104, 106, 108, 110, 112, 114, 116, 118, 120, 122).

The novel feed system for this generator system of this invention is shown in more detail in FIG. 6, FIG. 7, FIG. 8, and FIG. 9.

Figure 7:
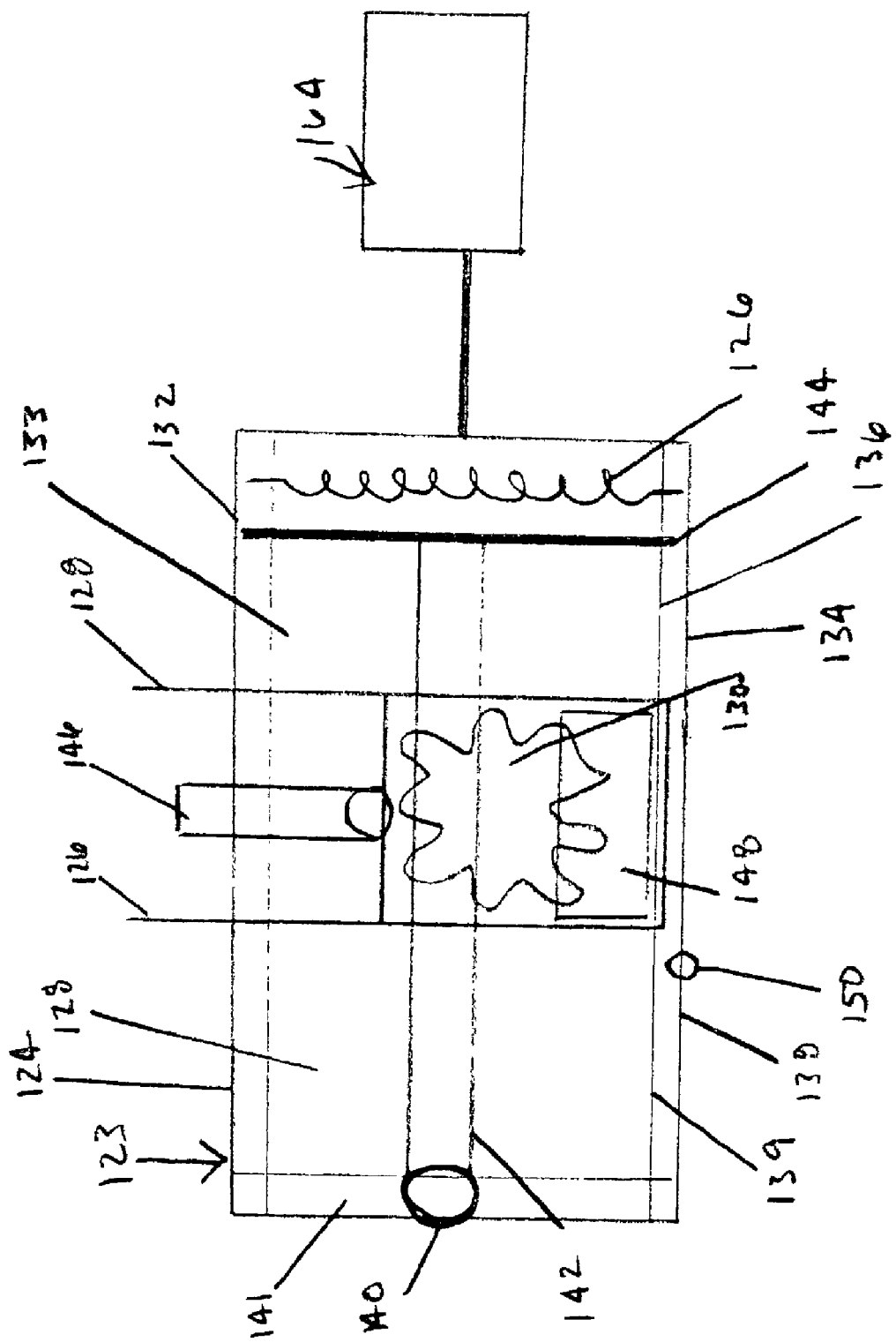
FIG. 7 is a top view of the feed system wherein waste has just been expelled from the chamber.

In FIG. 6 and FIG. 7, the feed system has a sealable double walled container (123) with an outer top side (124) and an inner top side (125). The outer top side (124) has a first rail (126) a second rail (128) and a door (130) for slidable engaging the first and second rails. The double walled container (123) has an outer first container side (132), an inner first container side (133), a outer second container side (134), an inner second container side (135), an outer container back (136), an inner container back (137), a outer container bottom (138), and an inner container bottom (139).

FIG. 6 and FIG. 7 also shows the container outer and inner backs further each have a hole disposed in them. The container outer back has an outer back hole (140). The container inner back has an inner back hole (141). The holes are aligned to permit a piston (142) to slide through the holed. The double wall container forms a space between one-half inch to 2-inches connected to the vessel of the generator.

The piston (142) penetrates the holes (140) and (141), as shown in FIG. 6 and FIG. 7. The piston is connected to a plate (144) on one end. The plate slides in the container (122) forming a surface against which to push the waste bales or loose waste material. The piston (142) is connected to the sealable opening locks to unlock all locks and to apply pressure such that the plate can be retracted to a position against the back (136) revealing or essentially forming a loading chamber (148) to permit loading of waste (26) into the loading chamber.

At least two spring loaded door locks (143 and 145) connect to the topside. Each door lock is adjacent to the door for locking the door in a closed position. At least two spring-loaded sealing locks (147 and 149) are mounted on the vessel for locking the sealable opening, such as in a closed position.

A second piston (146) is connected to the door locks to unlock and retract the door for loading waste.

At least one inert gas injector (150) is mounted to at least one side or to the bottom of the container for flooding the loading chamber with inert gas, which assists in the movement of the gas and increases safety of the system to prevent "back burning" of fire from the generator as the waste is loaded into the chamber. This inert gas insertion technique into the loading chamber of the automatic feeding system (24) (See FIG. 1) is a significant and key advantage of the system from a safety and quick and efficient handling perspective.

Additionally, a liquid cooling system (152) is disposed in the space created by the double walls of the container to keep the feeding system cool and safe to work with for the operators and owner of the generator.

FIG. 8 shows the inert gas injectors (150, 154, 156, 158, 160, 162) disposed on the back (136) of the piston.

FIG. 9 shows the controller (164) that is used for operating the locks, door and sealable opening of the feeding system.

In a preferred embodiment, the liquid cooling system uses water as the cooling carrier.

In another preferred embodiment the feeding system can utilize at least one pneumatic piston, or a hydraulic piston or a mechanical piston as at least one of the pistons of the system. It is contemplated that a combination of these types of pistons could be used and controlled by the controller (164).

In a preferred embodiment, it is contemplated that for the feed system the sealable opening of the vessel is a locking sliding door. The locks of the system, such as for the sliding door are contemplated as being hydraulic locks and operable by the same controller (164) or by an independent controller.

In still another embodiment, it is contemplated that the feed system the door and the sealable opening are hydraulically actuated.

For the gas injectors mounted in the container, it is contemplated that at least two could be used, one on each side of the container and the inert gas that they inject could be nitrogen, argon, helium, carbon dioxide or combinations thereof.

In still another embodiment of the feed system it is contemplated that the container top side, first rail, second rail, door, first container side, second container side, container back, container bottom are all made from an at least one-inch thick metal alloy, such as carbon steel and its alloys, stainless steel and its alloys, titanium and its alloys, or combinations thereof.

As to dimensions of the feed system, it is contemplated that the plate has dimensions of 30-inches by 50-inches by 60-inches and the plate has a thickness between one-half inch and 2-inches. The plate could be made from a flame sprayed coating disposed on all sides of the plate, and this coating could be a ceramic coating, such as one capable of resisting heat up to 12,000 degrees Celsius. The piston is preferably connected to the plate at the center of the plate and the piston has an overall length from between 10 and 400 feet. In one embodiment, the piston is a solid rod.

As to size, the feed system container preferably has an outside height between 12 feet and 400 feet, a length between 10 feet and 400 feet, and a width between 5 feet and 400 feet. More preferably the feed system container has a height between 12 feet and 18 feet, a length between 10 feet and 30 feet, and a width of between 5 feet and 14 feet It is contemplated that the waste for use in the feed system is either EPA category of MUNICIPAL SOLID WASTE, SPECIAL WASTE including tires and medical waste, or HAZARDOUS WASTE.

It is contemplated that for the feed system the controller is a computer based electro-mechanical device for controlling the pistons The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled

What is claimed is:

1. A feed system for loading waste into a fuel gas generator system wherein said fuel gas generator system comprises:
   a. a vessel consisting of a front, a back, a bottom, a first side, a second side, a third side, and a feed ramp:
   b. a moveable non-transferred torch disposed in at least one side of said vessel for contacting said waste and creating molten material;
   c. a moveable transferred torch for contacting the molten material wherein the transferred torch is disposed in at least one side of said vessel;
   d. at least one steam injector disposed in at least one side of said vessel;

e. at least one molten material outlet disposed in the back of said vessel;
f. at least one gas outlet disposed in the third side of the vessel for transferring gas from the vessel to a dray scrubber wherein said dry scrubber further has a dry scrubber outlet;
g. a wet scrubber connected to the dry scrubber outlet for receiving gas from the dry scrubber and further scrubbing said gas and passing said gas to a wet scrubber outlet;
h. wherein said feed system comprises:
i. a sealable double walled container having a outer top side and an inner top side, and wherein the outer top side has a first rail and a second rail and a door for slidable engaging the first and second rails;
ii. an outer first container side, an inner first container side, a outer second container side, an inner second container side, an outer container back, an inner container back, a outer container bottom, and an inner container bottom, wherein said outer container back has an outer back hole and said inner container back has an outer back hole and said inner container has an inner back hole, and wherein said holes are aligned and said double wall construction comprises a space between one-half inch to 2-inches connected to the vessel;
iii. a piston penetrating said holes, wherein the piston is connected to a plate and wherein the plate is moveably disposed in said container;
iv. at least two spring loaded door locks connected to the top side, each door lock adjacent to the door for locking said door in a closed position;
v. at least two spring loaded sealing locks mounted on the vessel for locking said sealable opening in a closed position;
vi. wherein the piston is connected to said sealable opening locks to unlock all locks and to apply pressure to retract the plate to a position against the back thereby providing a loading chamber to insert waste;
vii. a second piston connected to said door locks to unlock and retract the door for loading waste;
viii. at least one inert gas injector mounted to at least one side or bottom of the container for flooding the loading chamber with inert gas;
ix. a liquid cooling system disposed in the space created by the double walls of the container; and
x. a controller for operating said locks, door and sealable opening.

2. The feed system of claim 1, wherein the liquid cooling system uses water as the cooling carrier.

3. The feed system of claim 1, wherein at least one of said pistons is pneumatic.

4. The feed system of claim 1, wherein said at least one of said pistons is hydraulic.

5. The feed system of claim 1, wherein said at least one of said pistons is mechanically operable.

6. The feed system of claim 1, wherein the sealable opening of the vessel is a locking sliding door.

7. The feed system of claim 1, wherein said locks are hydraulic locks.

8. The feed system of claim 1, wherein the door and the sealable opening are hydraulically actuated.

9. The feed system of claim 1, wherein at least two inert gas injectors are mounted in the container.

10. The feed system of claim 1, wherein the inert gas is a member of the group: nitrogen, argon, helium, carbon dioxide and combinations thereof.

11. The feed system of claim 1, wherein said container top side, first rail, second rail, door, first container side, second container side, container back, container bottom comprises an at least one-inch thick metal alloy.

12. The feed system of claim 11, wherein said metal alloy comprises a member of the group: carbon steel and its alloys, stainless steel and its alloys, titanium and its alloys, and combinations thereof.

13. The feed system of claim 1, wherein said plate has dimensions of 30-inches by 50-inches by 60-inches and aid plate has a thickness between one-half inch and 2-inches.

14. The feed system of claim 1, where said plate further comprises a flame sprayed coating disposed on all sides of said plate.

15. The feed system of claim 14, wherein said coating is a ceramic coating capable of resisting heat up to 12,000 degrees Celsius.

16. The feed system of claim 1, wherein said piston is connaected to the plate at the center of the plate and the piston has an overall length from between 10 and 400 feet.

17. The feed system of claim 1, wherein said piston is a solid rod.

18. The feed system of claim 1, wherein said container has an outside height between 12 feet and 400 feet, a length between 10 feet and 400 feet, and a width between 5 feet and 14 feet.

19. The feed system of claim 18, wherein said container has a height between 12 feet and 18 feet, a length between 10 feet and 30 feet, and a width of between 5 feet and 14 feet.

20. The feed system of claim 1, wherein said waste comprises a member from the EPA category of MUNICIPAL SOLID WASTE.

21. The feed system of claim 1, wherein said waste comprises a member from the EPA category of SPECIAL WASTE including tires and medical waste.

22. The feed system of claim 1, wherein said waste comprises a member from the EPA category of HAZAROUS WASTE.

23. The feed system of claim 9, further comprising up to four additional inert gas injectors mounted in the container.

24. The feed system of claim 1, wherein the controller is a computer based electromechanical device for controlling the pistons.

25. A fuel gas generator feed system comprising
a container comprising a first sealable opening for loading waste and a second sealable opening for receiving waste for transfer into the vessel;
a piston comprising a plate operable to move waste from the container to the vessel, wherein the plate is moveably disposed in the container;
a container door lock operable to lock the first sealable opening in a closed position;
a vessel sealing lock operable to lock the second sealable opening to the vessel in a closed position;
at least one inert gas injector operable to flood the container with inert gas when the piston moves waste into the vessel; and
a controller for operating the container door lock, vessel sealing lock, first sealable opening, and second sealable opening, wherein the controller prevents the second sealable opening from opening unless the first sealable opening is closed and the container door lock is engaged with the first sealable opening.

26. The feed system of claim 25 wherein the container comprises a sealable double walled container having an outer top side and an inner top side, and wherein the outer top side has a first rail, a second rail, and a door for slidable engaging the first rail and second rail to seal the first sealable opening.

27. The feed system of claim 26 further comprising a liquid cooling system disposed in the space created by double walls of the container.

28. The feed system of claim 25 wherein the vessel sealing lock and container door lock comprise hydraulic locks.

29. The feed system of claim 25, wherein the controller is operable to hydraulically actuate the first sealable opening and the second sealable opening to seal these openings.

30. A process for using a feed system for a fuel gas generator comprising the steps of:

loading waste into a container through a first sealable door;

locking the first sealable door in a closed position;

flooding the container with inert gas;

opening a second sealable door, wherein the second sealable door provides access to a fuel gas generator vessel and the second sealable door cannot open unless the first sealable door is locked; and actuating a piston, whereby the piston moves the waste through the second sealable door.

* * * * *